(12) United States Patent
Shen

(10) Patent No.: US 6,687,659 B1
(45) Date of Patent: Feb. 3, 2004

(54) METHOD AND APPARATUS FOR ABSORBING BOUNDARY CONDITIONS IN NUMERICAL FINITE-DIFFERENCE ACOUSTIC APPLICATIONS

(75) Inventor: Yunqing Shen, Owasso, OK (US)

(73) Assignee: ConocoPhillips Company, Houston, TX (US)

(*) Notice: Subject to any disclaimer, the term of this patent is extended or adjusted under 35 U.S.C. 154(b) by 0 days.

(21) Appl. No.: 09/535,232

(22) Filed: Mar. 24, 2000

(51) Int. Cl.$^7$ .............................. G06F 17/10; G01V 1/28
(52) U.S. Cl. .............................. 703/2; 703/10; 367/73; 702/14; 711/173
(58) Field of Search .............................. 703/2, 10, 22; 367/50, 51, 52, 53, 72, 73; 702/14, 18; 711/170, 171, 172, 173

(56) References Cited

U.S. PATENT DOCUMENTS

| | | | |
|---|---|---|---|
| 4,888,742 A | 12/1989 | Beasley | 367/53 |
| 4,935,904 A | 6/1990 | Chambers et al. | 367/38 |
| 4,943,950 A | 7/1990 | Beasley et al. | 367/50 |
| 5,394,325 A | 2/1995 | Schneider | 364/420 |
| 5,999,488 A | 12/1999 | Smith | 367/50 |
| 6,125,330 A | * 9/2000 | Robertson et al. | 702/14 |

OTHER PUBLICATIONS

Rappaport, C.M. Interpreting and Improving the PML Absorbing Boundary Condition Using Anisotropic Lossy Mapping of Space, IEEE Transactions on Magnetics, vol. 32, No. 3, May 1996, pp. 968–974.*
Chew et al., W.C. Using Perfectly Matched Layers for Elastodynamics, Antennas and Propagation Society International Symposium, IEEE, vol. 1, Jul. 1996, pp. 366–369.*
Huaiying et al., Tan Standing–Traveling Wave Boundary Condition (STWBC) for Finite–Difference Time–Domain Mesh Truncation, Electronics Letters, vol. 36, Isuue 6, Mar. 2000, pp. 508–509.*
Chew et al., W.C. Complex Coordinate System as a Generalized Absorbing Boundary Condition, Antennas and Propagation Society International Symposium, IEEE, vol. 3, Jul. 1997, pp. 2060–2063.*
Mittra et al., R. A Review of Some Recent Advances in Perfectly–Matched Absorbers for Mesh Truncation in FEM, Antennas and Propagation Society International Symposium, Jul. 1997, IEEE, vol. 2, pp. 1302–1305.*
Xu et al., J. Numerical Validations of a Nonlinear PML Scheme for Absorbtion of Nonlinear Electromagnetic Waves, IEEE Transactions on Microwave Theory and Techniques, vol. 46, No. 11, Nov. 1998, pp. 1752–1758.*
Zeng et al., Y. Q. Acoustic Detection of Buried Objects in 3–D Fluid Saturated Porous Media: Numerical Modeling, IEEE Transactions on Geoscience and Remote Sensing, vol. 39, No. 6, Jun. 2001, pp. 1165–1173.*

* cited by examiner

*Primary Examiner*—Russell Frejd
(74) *Attorney, Agent, or Firm*—Ryan N. Cross

(57) ABSTRACT

A hybrid approach is disclosed for implementing highly efficient absorbing boundary conditions in three dimensional (3D) finite difference (FD) acoustic applications such as post-stack and pre-stack seismic migration, and forward modeling. The "Perfectly matched layer" (PML) absorbing medium is able to absorb waves arriving at all incidence angle and at any frequency. An optimized PML medium is disclosed including its formulation and implementation to reduce its memory usage and associated computational cost. To avoid costly and cumbersomely implementation of PML medium at the edges and corners of truncated 3D numerical models the PML medium is combined with a "One-way Wave Equation" (1WWE) absorbing boundary to eliminate reflections and diffraction from the edges and corners. The hybrid approach significantly reduces the memory usage and computational cost for multiprocessor applications when large 3D applications are partitioned among multiple processors and artificial boundaries are created between multiple processors.

19 Claims, 4 Drawing Sheets

METHOD AND APPARATUS FOR ABSORBING BOUNDARY CONDITIONS IN NUMERICAL FINITE-DIFFERENCE ACOUSTIC APPLICATIONS

The present invention relates to migration of seismic reflections performed in a high-speed digital computer, and more particularly to suppressing reflection artifacts imposed on a numerical model by artificial boundaries which limit computational size.

BACKGROUND OF THE INVENTION

For many years seismic exploration for oil and gas has involved the use of a source of seismic energy and its reception by an array of seismic detectors, generally referred to as geophones when used on land, and as hydrophones when used offshore. On land the source of seismic energy can be a high explosive charge electrically detonated in a borehole located at a selected point on a terrain, or another energy source having capacity for delivering a series of impacts or mechanical vibrations to the earth's surface. The acoustic waves generated in the earth by these sources are transmitted back from strata boundaries and reach the surface of the earth at varying intervals of time, depending on the distance and the characteristics of the subsurface traversed. These returning waves are detected by the geophones, which function to transduce such acoustic waves into representative electrical signals. In use an array of geophones is generally laid out along a line to form a series of observation stations within a desired locality, the source injects acoustic signals into the earth, and the detected signals are recorded for later processing using digital computers where the data are generally quantized as digital sample points such that each sample point may be operated on individually. Accordingly, seismic field records are reduced to vertical and horizontal cross sections which approximate subsurface features. The geophone array is then moved along the line to a new position and the process repeated to provide a seismic survey. More recently seismic surveys involve geophones and sources laid out in generally rectangular grids covering an area of interest so as to expand areal coverage and enable construction of three dimensional (3D) views of reflector positions over wide areas.

The general principle of offshore prospecting consists of using a seismic source to create a disturbance in the marine environment (e.g. by releasing a volume of air or steam into the water, by varying the volume of an immersed body, by an implosion, etc), and in using hydrophone detectors towed by a prospecting ship, or by geophones placed on the seabed, to obtain seismic data for extracting useful information concerning the geology of the subsoil. Typically in offshore exploration, a long streamer cable that electrically connects multiple hydrophones is towed behind the prospecting ship. Acoustic waves are periodically generated in the water, reflected from subterranean earth layers, and detected by the hydrophones. The hydrophones convert the detected seismic waves into representative electrical signals, which may be processed on the ship, and/or recorded on a storage medium such as magnetic tape for later processing.

As oil and gas production from known reservoirs and producing provinces declines, explorationists seek new areas in which to find hydrocarbons. Many of the new areas under exploration contain complex geological structures that are difficult to image with 2D techniques. Accordingly, 3D seismic processing has come into common use for mapping subterranean structures associated with oil and gas accumulations. Geophysicists, however, are well aware that a 2D seismic record section or 3D view is not a true reflectivity from the earth, but is instead a transformation of the earth's reflectivity into a plane where each recorded event is located vertically beneath the source/receiver midpoint. Steep dip, curved surfaces, buried foci, faults and other discontinuities in subterranean structure each contribute their unique characteristics to the seismic record and, in complexly faulted and folded areas, make interpretation of the geological layering from the seismic record extremely difficult. Migration is the inverse transformation that carries the plane of recorded events into a true 3D reflectivity of the earth, thereby placing reflections from dipping beds in their correct location and collapsing diffractions.

Of the various available migration methods, wave-equation migration is considered to be superior because it is based on accurate propagation of seismic waves through complex models of the earth. Wave equation computations using numerical techniques have led to a procedure called reverse time migration (RTM). By this procedure, the wavefield recorded at the surface is imaged in depth using a model of earth velocities in a numerical solution of the wave-equation. The wavefield at the surface is used as a boundary condition for the numerical computations. Proceeding by inserting the data at the surface of a computational grid for each record time step, starting with the last recorded time sample, and ending with the first, the wavefield migrates to the position from which the reflections originated.

Recently, numerical finite-difference methods have been widely used for obtaining seismic images based on pre-stack and post-stack RTM techniques, and for obtaining synthetic seismograms for studying exploration related problems. A practical procedure for doing reverse time migration is disclosed in a publication, Mufti, I. R., et al, "Finite-Difference Depth Migration of Exploration-Scale 3D Seismic Data," Geophysics, Vol. 61. No. 3 (May-June 1996), which is incorporated herein by reference. RTM, which requires enormous computer resources as compared to simpler or less accurate migration algorithms, has recently been applied to 3D seismic data. An improved image results from accuracy (dynamic as well as kinematic) of the finite-difference method over conventional normal-moveout and raytracing based seismic imaging methods. In this RTM procedure a finite-difference earth model, which is based on the best estimate of subsurface velocities, is required. This involves dividing the model simulation space into a large number of elementary grid blocks, and assigning a velocity value to each grid.

A common problem with the finite-difference migration method is that simulation of wave propagation in an extensive portion of the earth must be modeled with limited computer resources, i.e., mainly limited central RAM memory in the computer such that the computational size of the model is truncated due to limited computer memory size. Accordingly, artificial boundaries that act as perfect reflectors are imposed by computer memory limitations, and if not properly handled cause unwanted reflection artifacts. These unwanted reflection artifacts may disrupt the image in complex ways and are not easily removed after the modeling and imaging processes are carried out.

One method of absorbing advancing waves in a 3D computational grid is an extensively used method known as a one-way wave equation (1WWE), proposed by Clayton and Engquist, 1980 "Absorbing Boundary Conditions for Wave-Equation Migration", Geophysics, Vol. 45 pp 895–904, and Keys, 1985 "Absorbing Boundary Conditions for Acoustic Media", Geophysics, Vol. 50 pp 89–902. This 1WWE method, however, is effective for absorbing advancing waves arriving only at or near a selective incident angle. More recently, much attention has been given to a method called the perfectly matched layer (PML) method, which was developed by Berenger (1994) "A Perfectly Matched Layer for the Absorpiton of Electromatic Waves", Journal of Computational Physics Vol. 114, pp 185–200, for use in a finite-difference time domain computations. The PML method, which was first applied to a 2D transverse electric wave problem, can absorb waves propagating at both near normal and high incident angles, and thus provides a reflectionless interface between the propagation region of interest and the PML layers at all incident angles of arriving waves. A PML layer can be conveniently applied on a planar face. However an edge or a corner of a rectangular finite difference numerical model volume requires a special tensor, which adds significantly to computational requirements. Yuan, et al., "Formulations and Validation of Berenger's PML Absorbing boundary for the FDTD Simulation of Acoustic Scattering," IEEE Transactions on Ultrasonics, Ferroelectrics, and Frequency Control, vol. 44, pp 816–822, July 1997, lays out a detailed implementation of the PML medium suitable for both 2D and 3D acoustic applications. However, this implementation of the PML medium requires computations for at least six component variables, and accordingly is an expensive approach in terms of computer capacity when applied to large 3D seismic problems.

Accordingly, an urgent need exists for a cost effective and straightforward method to reduce boundary reflection artifacts in finite-difference 3D wave equation computations.

The basic computing requirements for successful 3D finite-difference acoustic wave equation seismic migration computations include a large memory and a high-speed processor, or preferably a multiprocessor massively parallel computing system for execution of numerical simulation software.

It is an object of the present invention to provide an absorbing boundary region for termination of a finite-difference time domain computation region.

A more specific object of the present invention is to eliminate unwanted artifacts (i.e. reflections and diffractions) arising from truncated boundaries imposed on a numerical acoustic model.

A still more specific object is to absorb simulated wavefield energy arriving at arbitrary incident angles at the boundaries of a finite-difference computational model, without significantly increasing computer memory capacity and/or computation time.

A further object is to reduce computational time and computer memory requirements by reducing the number of variables and computational layers that are employed in the absorbing boundaries.

A still further object of this invention is to produce a computer program which generates high resolution images of seismic wave propagation.

SUMMARY OF THE INVENTION

According to the present invention the foregoing and other objectives and advantages are attained in a method of eliminating reflection artifacts which are introduced in finite-difference acoustic wavefield propagation computations by reflections from artificial boundaries. These artificial boundaries are imposed by a memory size lacking capacity for containing an extensive earth velocity model based on a large 3D volumetric seismic survey. In this method, two types of absorbing boundaries conditions are imposed to form an absorbing region surrounding the truncated earth velocity model boundaries, thus providing an absorbing region which presents an essentially reflectionless interface for outgoing seismic waves. Accordingly, the truncated boundaries are terminated in a manner that absorbs simulated wave energy contained in an advancing seismic wave, and unwanted reflection artifacts, which would otherwise be reflected from artificial boundaries, are eliminated.

The reflection elimination method according to this invention uses a hybrid modeling scheme to provide the absorbing region which is effective at essentially all incidence angles of the advancing wave. PML conditions, which can absorb waves at essentially all incidence angles, are coupled to finite-difference wavefield propagation computation regions at vertical side faces and the bottom of rectangular shape memory volumes. In cooperation with the imposed PML conditions, 1WWE conditions, which absorb advancing waves at or near a selective incidence angle, are coupled to the exterior surface of the PML absorbing layers, and to the edges and corners of the truncated earth velocity model, where implementing the PML type conditions is significantly more complicated when compared to the flat surface PML implementation.

When using the PML and 1WWE conditions in combination with the finite-difference computations, the procedure for computing wave propagation calls for updating variables in the various regions in the following order: first the time and space variables in the finite-difference region, followed by applying 1WWE conditions at the vertical edges and corners, updating particle velocity and a specifically defined variable, q, in the interior of the PML region, applying 1WWE at the exterior of the PML regional, updating pressure in the interior of the PML, and updating pressure in the two layers in the wavefield propagation region immediately above the absorbing region.

In another aspect of this invention a highly efficient representation of the PML absorbing conditions is achieved by reducing the number of variable components used in the PML computations from a conventional six components to four components. This reduction is achieved based on introducing a new variable, herein identified as "q", which is defined in a manner that eliminates two of the usual six variables, as will be illustrated hereinafter.

In yet another aspect of the invention, apparatus comprises a computer programmed for migration of seismic data which eliminates undesired reflections and diffractions from truncated boundaries imposed on 3D finite-difference acoustic applications. For a large scale 3D survey, the computer is a massively parallel machine.

The hybrid approach for implementing absorbing regions is beneficial for its rapid attenuation of waves arriving at arbitrary angles, which leads to elimination of reflection artifacts, and is ideal for implementation on massively parallel super computers such as a CRAY T3E or an IBM SP2. In these large 3D applications, where the computational regions for the velocity model are desirably partitioned between the multiple processors, artificial boundaries are inherently created between the multiple processors. Accordingly, employing the hybrid modeling scheme of this invention optimizes the absorbing region to reduce memory usage and the related computational costs, especially when applied to large 3D seismic surveys.

DETAILED DESCRIPTION OF A PREFERRED EMBODIMENT

The basic data to which this invention is applied is in the form of a spatial sequence of unmigrated seismic time scale traces, which have been recorded in a land or a marine 3D seismic survey, then gathered, digitized and optionally stacked as is known in the art. A first step in processing the real seismic data according to this invention is to set up an earth velocity model for carrying out finite-difference computations for propagation of a wave equation in a high speed or massively parallel computer system such as a CRAY T3E or IBM SP2. The earth velocity model involves setting up computer memory locations for holding values of velocity of the subterranean medium as well as locations for holding values of other wavefield parameters such as pressure and particle velocity.

It is realized, however, that seismic wave propagation involves an essentially unlimited extent of the earth while the number of locations used in the velocity model is necessarily limited by the extent of computer memory available. Accordingly, a truncated boundary imposed on the velocity model acts as an artificial boundary which is a near-perfect reflector. According to the invention, the velocity model used in the finite-difference computations is surrounded by combination of absorbing regions so as to provide a reflectionless interface for ongoing seismic waves.

Figure 1:
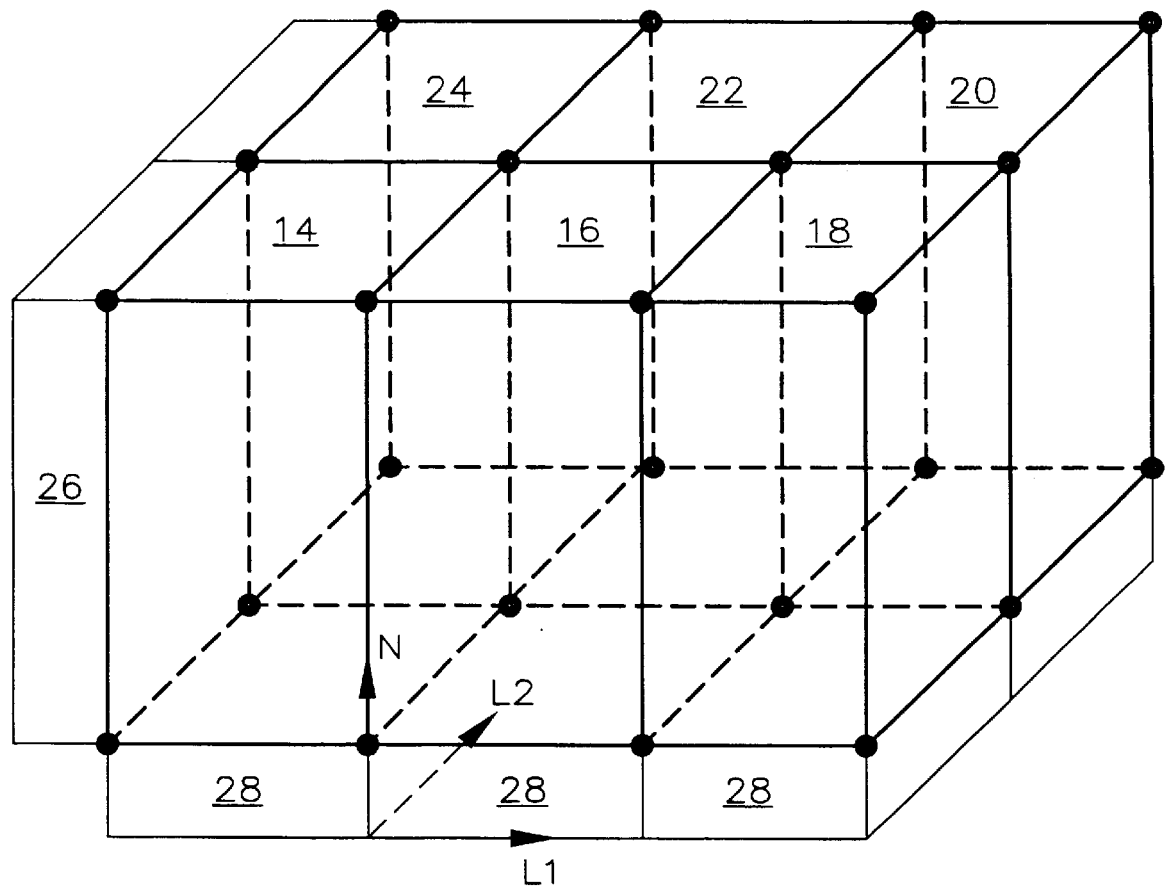
FIG. 1 is a perspective view illustrating a finite-difference computational volume divided into six subvolumes for defining a parallel computing architecture, and having absorbing regions applied at a side face and bottom of the subvolumes.

FIG. 1 illustrates a computer memory volume for storing a large scale 3D velocity model, which is suitable for finite-difference time domain wavefield propagation computations, generally illustrated at 12. By way of illustration, the velocity model is divided and stored into six unequal subvolumes, 14, 16, 18, 20, 22, and 24 for assigning work loads to each of six parallel arranged processors. In an actual application, the number of processors utilized and the division boundaries of the velocity model, which define the workload for the processor, would be adjusted to minimize computer simulation time. Accordingly, the subvolumes illustrated in FIG. 1, and the corresponding computer work loads may or may not be equal in a given application. The dots represent corners of the subvolumes between parallel processors, and the solid bold lines and the dashed lines represent edges of the subvolume memories. Generally, four vertical PML absorbing regions are applied on flat surfaces, i.e. front, back, left and right faces, and one generally horizontal bottom surface for each subvolume. One-way wave equations are applied at the edges and corners of each of the subvolumes, where complications arise in applying PML layers, and the 1WWE are also applied at the exterior of the PML absorbing regions. For clarity only PML absorbing regions 26 applied to the left side, of subvolumes 14 and 24 and region 28 applied to the bottom of subvolumes 14, 16, 18 and 20 are illustrated in FIG. 1. However, as previously mentioned the absorbing regions are applied to surround the truncated regions for a seismic wave advancing downwardly from the surface. A coordinate system (L1, L2 and N), which is employed in the absorbing regions is shown at the bottom of the working area assigned for a processor associated with subvolume 16.

Figure 2:
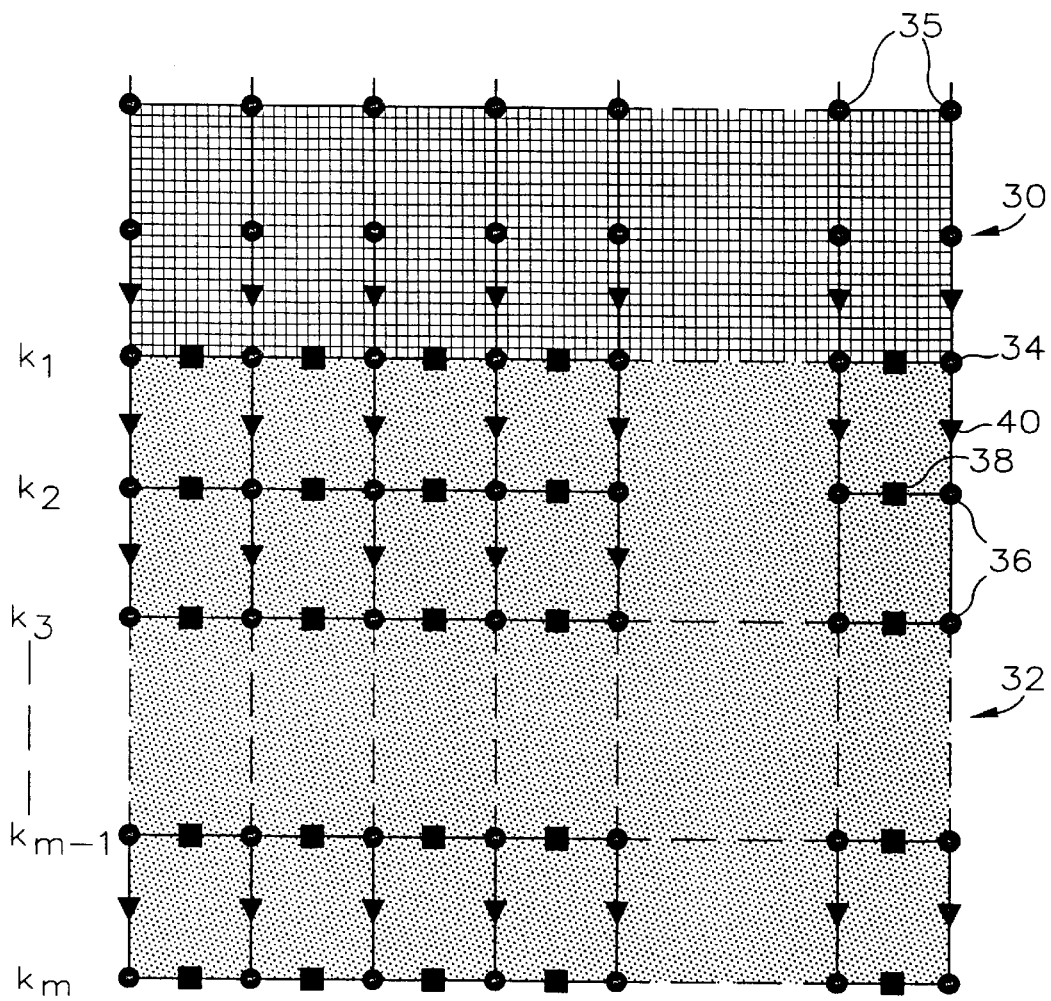
FIG. 2 is a schematic illustration of a 2D grid layout showing the connection between the finite-difference propagating wavefield region and the absorbing region.

FIG. 2 depicts implementation of a grid for the connections between finite-difference propagating wavefield computation region, generally illustrated at 30, and the PML absorbing region generally illustrated at 32. The connecting layer 34 is shown as a solid bold line. The propagating wavefield region 30 includes three pressure variables, including: previous p0, current p1, and future p2, which are shown as dots 35 on the standard discrete grid. The absorbing region 32 has four variables which are staggered on the discrete grid generally illustrated at 32. These variables are the pressure p shown as dots 36, two particle velocity components $U_{L1}$ and $U_{L2}$, where $U_{L1}$ is shown as a solid rectangle 38, and $U_{L2}$ is perpendicular to the plane of the paper and thus not shown here. A variable q, which is illustrated as a solid triangle at 40, is introduced to simplify computations as will be more fully explained herein below. The absorbing region includes m layers, thus the variables, p, $U_{L1}$, $U_{L2}$, and q have m layers.

For a discussion of determining grid spacing as well as time sampling intervals refer to the publication of Mufti et al., previously incorporated by reference. Accordingly, the region immediately surrounding the truncated boundary is herein referred to as an absorbing region illustrated at 32 in FIG. 2. The wavefield propagation region for the finite-difference interior of the velocity model is illustrated at 30.

In effect, the absorbing grid region 32 can be considered a subset of grids over which simulated waves are sufficiently attenuated such that reflections from an artificial boundary are essentially eliminated without interfering with the incident wave.

The PML absorbing medium is governed by a set of lossy acoustic equation (Yuan, et. Al., 1997 previously identified), which attenuate waves propagating into the PML medium without producing reflections. To apply the PML medium on a plane boundary such as the bottom of a 3D model 28 in FIG. 1, the set of lossy acoustic equation in the Cartesian coordinates is:

$$\frac{\partial P_{L1}}{\partial t} = -C^2(L_1, L_2)\frac{\partial U_{L1}}{\partial L_1} \tag{1a}$$

$$\frac{\partial P_{L2}}{\partial t} = -C^2(L_1, L_2)\frac{\partial U_{L2}}{\partial L_2} \tag{1b}$$

$$\frac{\partial p_N}{\partial t} + \alpha p_N = -C^2(L_1, L_2)\frac{\partial U_N}{\partial N} \tag{1c}$$

$$\frac{\partial U_{L1}}{\partial t} + \beta U_{L1} = -\frac{\partial p}{\partial L_1} \tag{1d}$$

$$\frac{\partial U_{L2}}{\partial t} + \beta U_{L2} = -\frac{\partial p}{\partial L_2} \tag{1e}$$

$$\frac{\partial U_N}{\partial t} = -\frac{\partial p}{\partial N} \quad (1f)$$

where $L_1$, and $L_2$ are two orthogonal axes that reside on the bottom of the absorbing region, and N is the normal of the bottom surface pointing inward as illustrated in FIG. 1. Using such coordinate system enables one to apply the PML medium on any boundary without changing notations. The variable $p=(p_{L1},+p_{L2}+p_N)$ is the acoustic pressure, $U_{L1}$, $U_{L2}$, and $U_N$ are three particle velocity components of a pressure wave, $C(L_1, L_2)$ is wave propagation velocity when an invariant unit density is assumed. $\alpha$ and $\beta$ are attenuation coefficients in the direction normal and parallel to the bottom, respectively. One important observation is that the PML medium degrades back to standard lossless acoustic medium when $\alpha$ and $\beta$ are zero.

Directly implementing the set of equation (1) is quite expensive in terms of memory requirement because of involving six variables. Here one can introduce an alternative approach that employs four variables. First there is introduced a variable q such that:

$$\frac{\partial q}{\partial t} + \alpha q = \frac{\partial U_N}{\partial t} \quad (2)$$

Applying Fourier transform on equation (2) one obtains:

$$-i\omega\bar{q} + \alpha\bar{q} = -i\omega\bar{U}_N \quad (3)$$

where $\omega$ is angular frequency, and $\bar{q}$, $\bar{U}_N$ are Fourier transforms of q and $U_N$, respectively. Re-organizing equation (3) and applying $\partial/\partial N$ on both sides of the equation:

$$\frac{\partial \bar{U}_N}{\partial N} = \left(1 + \frac{i\alpha}{\omega}\right)\frac{\partial \bar{q}}{\partial N} \quad (4)$$

Similarly, applying Fourier transform on equation (1c) one obtains:

$$-i\omega\bar{p}_N + \alpha\bar{p}_N = -C^2(L_1, L_2)\frac{\partial \bar{U}_N}{\partial N} \quad (5)$$

where $\bar{p}_N$, $\bar{U}_N$ are Fourier transforms of $p_N$ and $U_N$ respectively. Re-organizing equation (5) and substituting equation (4) into it one obtains:

$$-i\omega\bar{p}_N = -C^2(L_1, L_2)\frac{\partial \bar{q}}{\partial N} \quad (6)$$

Apply inverse Fourier transform on equation (6):

$$\frac{\partial p_N}{\partial t} = -C^2(L_1, L_2)\frac{\partial q}{\partial N} \quad (7)$$

combining equations (1a), (1b), and (7), one obtains:

$$\frac{\partial p}{\partial t} = -C^2(L_1, L_2)\left(\frac{\partial U_{L1}}{\partial L_1} + \frac{\partial U_{L2}}{\partial L_2} + \frac{\partial q}{\partial N}\right) \quad (8)$$

Accordingly, a set of four equations are obtained which govern the PML medium:

$$\frac{\partial q}{\partial t} + \alpha q = -\frac{\partial p}{\partial N} \quad (9a)$$

$$\frac{\partial U_{L1}}{\partial t} + \beta U_{L1} = -\frac{\partial p}{\partial L_1} \quad (9b)$$

$$\frac{\partial U_{L2}}{\partial t} + \beta U_{L2} = -\frac{\partial p}{\partial L_2} \quad (9c)$$

$$\frac{\partial p}{\partial t} = -C^2(L_1, L_2)\left(\frac{\partial U_{L1}}{\partial L_1} + \frac{\partial U_{L2}}{\partial L_2} + \frac{\partial q}{\partial N}\right) \quad (9d)$$

It is noted, that only four variables are employed in equation (9) governing the PML computations.

With the above set of governing equation (9), one can efficiently implement an absorbing region connected to the staggered grid. It is straightforward to connect the absorbing region to the acoustic wave field implemented on the similar staggered grid. Therefore, in the remaining discussion, a connection scheme between the absorbing region and the acoustic wavefield implemented on the standard grid is described. FIG. 2 is a 2D schematic diagram showing such a connection on a typical $L_1$-N plane; similar connection layout is also applied on $L_2$-N plane. The variables p, $U_{L1}$, and $U_{L2}$ and q in equation (9) have m layers in the absorbing region along the N-axis.

Using a first-order finite difference approximation to discretize time and spatial derivatives in equation (9). Assume the discrete sample convention:

$$p^n(i,j,k) \equiv p(idx, jdy, kdz, ndt);$$

$$U_{L1}^n(i,j,k) \equiv U_{L1}((i+\tfrac{1}{2})dx, jdy, kdz, (n+\tfrac{1}{2})dt);$$

$$U_{L2}^n(i,j,k) \equiv U_{L2}(idx, (j+\tfrac{1}{2})dy, kdz, kdz, (n+\tfrac{1}{2})dt);$$

$$q^n(i,j,k) \equiv q(idx, jdy, (k+\tfrac{1}{2})dz, (n+\tfrac{1}{2})dt); \quad (10)$$

where dt is the time sample interval and n is the time index; dx, dy, and dz are the spatial sample interval and i, j, and k are the spatial indices along $L_1$-axis, $L_2$-axis, and N-axis respectively. Our numerical experiments suggest that the two attenuation coefficients $\alpha$ and $\beta$ varying with N-axis only are sufficiently enough to attenuate incoming waves in the absorbing region. Exponential functions varying with N-axis are adapted for both $\alpha$ and $\beta$:

$$\alpha(i,j,k) = \alpha(kdz) = \alpha_0\left(\frac{k-1}{m}\right)^r \quad (11)$$

$$\beta(i,j,k) = \beta(kdz) = \beta_0\left(\frac{k-1}{m}\right)^r$$

where m is the number of layers used in the absorbing region, $\beta_0$, $\beta_0$, and r are constants. The discretized form of equation (9a) is:

$$\frac{q^{n+1}(i,j,k) - q^n(i,j,k)}{dt} + \alpha \frac{q^{n+1}(i,j,k) + q^n(i,j,k)}{2} = \quad (12)$$

$$-\frac{p^n(i,j,k+1) - p^n(i,j,k)}{dz}$$

Solving for $q^{n+1}(i,j,k)$:

$$q^{n+1}(i, j, k) = \frac{2 - \alpha(k)dt}{2 + \alpha(k)dt}q^n(i, j, k) + \frac{2}{2 + \alpha(k)dt}\frac{dt}{dz}(p^n(i, j, k+1) - p^n(i, j, k)) \quad (13)$$

Similarly from equation (9b–c) we have:

$$U_{L1}^{n+1}(i, j, k) = \frac{2 - \beta(k)dt}{2 + \beta(k)dt}U_{L1}^n(i, j, k) + \frac{2}{2 + \beta(k)dt}\frac{dt}{dx}(p^n(i+1, j, k) - p^n(i, j, k)) \quad (14)$$

Expression for equation (9d) is given by:

$$\frac{P^{n+1}(i, j, k) - P^n(i, j, k)}{dt} = \quad (16)$$

$$- C^2(L_1, L_2)((U_{L1}^n(i+1, j, k) - U_{L1}^n(i, j, k))/dx + (U_{L2}^n(i, j+1, k) - U_{L1}^n(i, j, k))/dy +$$

$$(q^n(i, j, k+1) - q^n(i, j, k))/dz$$

$$U_{L2}^{n+1}(i, j, k) = \quad (15)$$

$$\frac{2 - \beta(k)dt}{2 + \beta(k)dt}U_{L2}^n(i, j, k) + \frac{2}{2 + \beta(k)dt}\frac{dt}{dy}(p^n(i, j+1, k) - p^n(i, j, k))$$

where $C(i,j,k_1)$ is the wave propagation velocity at the bottom of the wavefield (FIG. 2). Solving for $P^{n+1}(i,j,k)$:

$$P^{n+1}(i, j, k) = P^n(i, j, k) - C^2(L_1, L_2)\left(\frac{dt}{dx}(U_{L1}^n(i+1, j, k) - U_{L1}^n(i, j, k)) + \right. \quad (17)$$

$$\left. \frac{dt}{dy}(U_{L2}^n(i, j+1, k) - U_{L2}^n(i, j, k) + \frac{dt}{dz}(q^n(i, j, k+1) - q^n(i, j, k))\right)$$

The above equations 13, 14, 15, 17 imply that the PML medium can only be implemented within the interior of the absorbing region (refer to FIG. 2). When incoming waves hit the exterior of the absorbing region, reflections and diffraction are generated, and the PML medium cannot effectively eliminate them. One finds that the 1WWE absorbing boundary can be easily implemented on the exterior of the PML absorbing region, including all four vertical sides and the bottom of the absorbing region. The 1WWE absorbing boundary is applied on the pressure (p) variable since only the pressure is connected back to the wavefield propagation regions. The discretized 1WWE absorbing boundary applied on the bottom of the absorbing region along N-axis, as an example, takes a form as:

$$P^{n+1}(i, j, k) = \quad (18)$$

$$P^n(i, j, km) - \frac{dt}{dz}C(L_1, L_2, K_1)(P^n(i, j, km) - P^n(i, j, km-1))$$

As those skilled in the art can appreciate, the method of this invention requires a large amount of calculations carried out for the governing equations which are adapted for connecting each of the various wave propagation and absorption regions. Accordingly, when combining the PML and 1WWE absorbing boundaries with the finite-difference region, it is important to provide a sequence of updating steps that will result in optimal performance for the absorbing regions.

Figure 3:
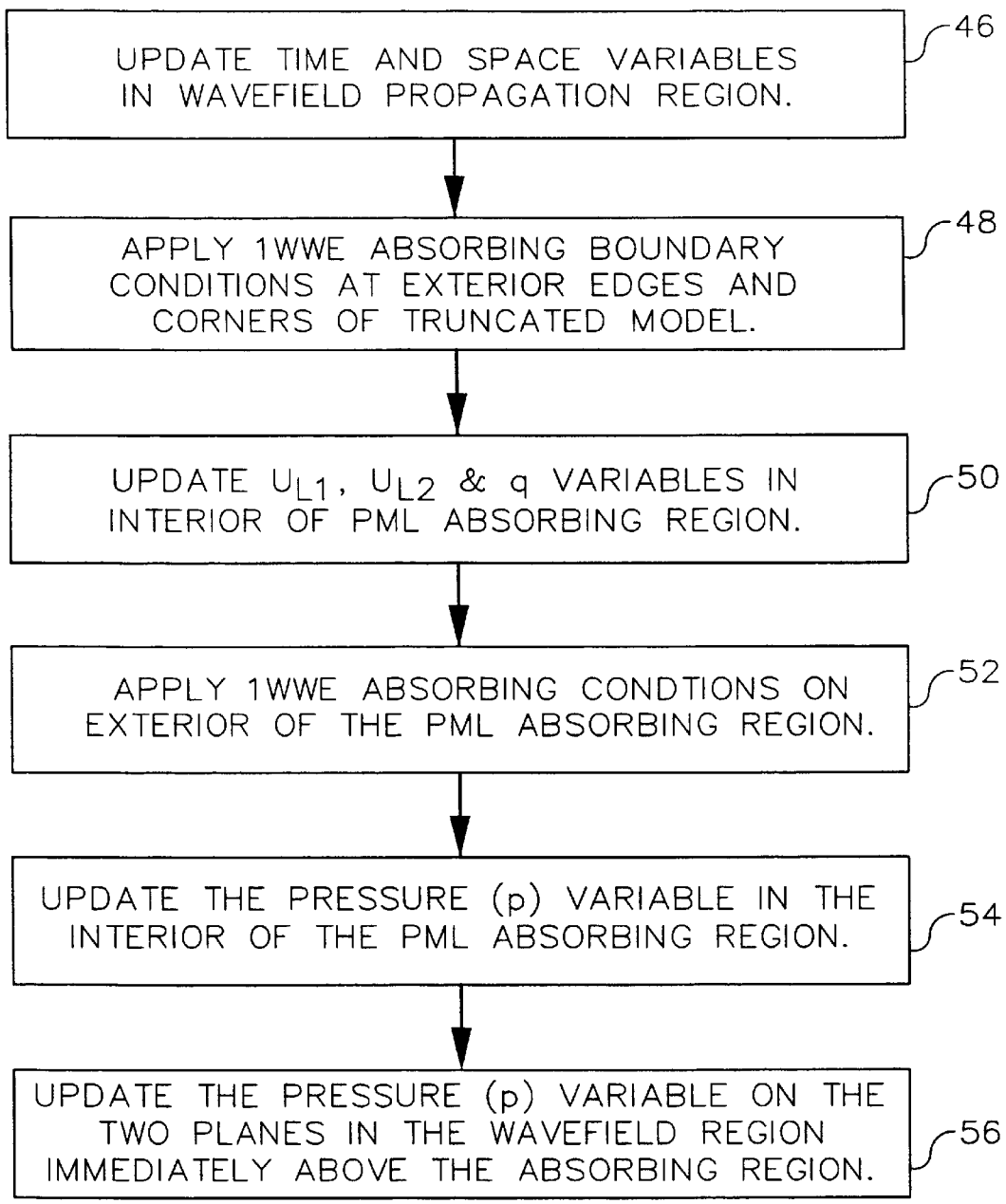
FIG. 3 is a simplified flow chart showing a sequence of processing steps for implementing absorbing boundary conditions according to the invention.

FIG. 3 is a simplified flow diagram of a preferred sequence of processing steps for computer implementation of the invention, which are applied at every time step in the acoustic application. As illustrated at 46 in FIG. 3, variables of time and space in the propagation region are updated first. The procedure then advances to step 48 for applying 1WWE absorbing conditions at the exterior edges and corners of the truncated velocity model. Next in step 50, the particle velocity variables $U_{L1}$, $U_{L2}$ and the defined variable q are updated in the interior of the PML absorbing region. Step 52, calls for applying 1WWE absorbing conditions at the exterior boundary of he PML absorbing region. Next, in step 54 the pressure variable p is updated in the interior of the PML absorbing region, and finally at step 56 the pressure variable p is updated on the two planes in the wavefield propagating region immediately above the absorbing region.

Figure 4:
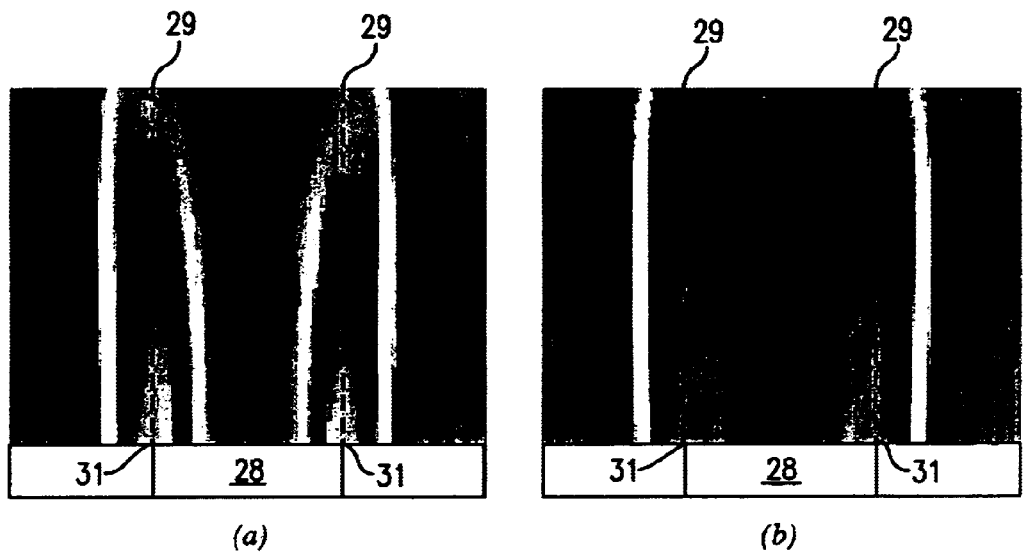
FIG. 4(a) is a vertical section of a central location in FIG. 1, showing diffractions generated between adjacent artificial borders with PML applied at the bottom of the wavefield.
FIG. 4(b) is a vertical section similar to FIG. 3(a) with both PML and 1WWE layers applied.
Figure 5:
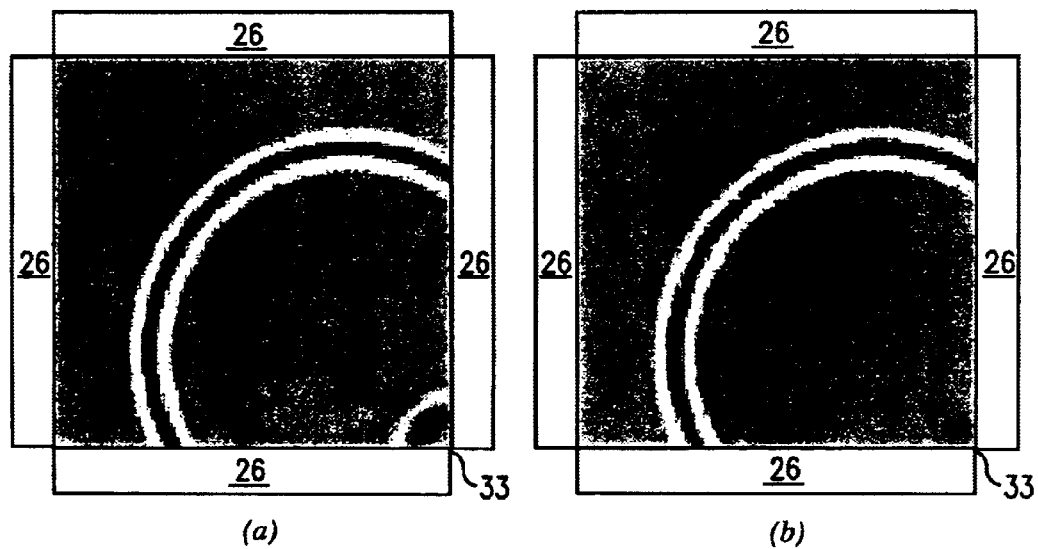
FIG. 5(a) is a horizontal section at a central location of FIG. 1, showing reflections generated from the corner of the volume with only PML applied around four vertical side faces of a subvolume in FIG. 1.
FIG. 5(b) is synthetic horizontal section similar to FIG. 4(a) with both PML and 1-WWE layers applied.

Referring now to FIG. 4, the effectiveness of the combinations of PML and 1WWE absorbing boundary condition to eliminate diffractions in an acoustic modeling application is illustrated by comparing FIGS. 4(a) and 4(b). FIG. 4(a) is a partial vertical cross section for the volume of FIG. 1 showing diffractions generated at corners 31 of the boundaries 29 of adjacent processors due to a wave advancing downwardly from a location on the surface, when the only absorbing region is a PML 28 applied at the bottom section of the truncated velocity model. In FIG. 4(b), which is the same section as FIG. 4(a), the diffraction is almost invisible when both PML and 1WWE conditions are applied at the bottom section of the truncated velocity model. By way of further illustration of the performance of the absorbing regions, a post-stack RTM migration is shown by the two horizontal time slices in FIG. 5. Referring first to FIG. 5(a), a reflection generated from the corner 33 of the truncated velocity model due to a wave advancing downwardly from a location on the surface is illustrated in the lower right hand corner of the FIG., when only the PML absorbing conditions surrounding the four vertical sides and bottom are applied. FIG. 5(b) is a similar FIG with both PML and 1WWE absorbing conditions applied to essentially eliminate the reflection shown in FIG. 5(a).

The benefit of combing the PML medium with 1WWE absorbing boundary is significant in eliminating reflections from those vertical columns (i.e. solid lines in FIG. 1) and diffractions from the corners (solid dots in FIG. 1) of the artificial wavefield boundaries. There is no economically straightforward approach to apply the PML medium on the column edges and corners. For a large application as shown in FIG. 1, message passing is necessarily employed between two adjacent processors when a wave propagates from one part of the wavefield (e.g. belong to a processor p1) to another part (e.g. belonging to a processor p2). An additional message passing scheme, without employing 1WWE absorbing boundary on the exterior of the absorbing region, would also be required between two adjacent absorbing regions.

For illustrative purposes, this invention has been described in connection with what is presently considered to be the most practical and preferred embodiments. Variations will occur to those skilled in the art which may be included within the scope and spirit of this invention, which is limited only by the appended claims.

That which is claimed is:

1. A method of eliminating reflections resulting from an advancing simulated seismic wave contacting an artificial boundary in a computer implemented migration of seismic data, said method comprising:
   (a) storing an earth velocity model having a wavefield propagation region in a computer memory, wherein said propagation region is truncated by limited capacity of said computer memory;
   (b) surrounding said computer memory contacting truncated boundaries of said propagation region with a wave absorbing region, wherein said absorbing region comprises two types of absorbing conditions;
   (c) wherein a first absorbing condition is applied on exterior surfaces of memory volumes contacting said truncated propagation region, and a second absorbing condition is applied at exterior edges and corners of said truncated propagation region in said computer memory;
   (d) imposing said second absorbing condition on the exterior surface of said first absorbing condition; and
   (e) computing seismic wave propagation in said earth velocity model and in said absorbing region, wherein said advancing simulated seismic wave is essentially absorbed in said absorbing region.

2. A method in accordance with claim 1, wherein said wave absorbing region presents an essentially reflectionless interface for outgoing waves advancing through said propagation region.

3. A method in accordance with claim 1, wherein said first absorbing condition is effective for attenuating waves at essentially all incident angles, and said second absorbing condition is effective for attenuating waves at or near a selective incidence angle.

4. A method in accordance with claim 1, wherein said memory comprises a rectangularly shape volume having four generally vertical side faces, and wherein said first absorbing condition is applied at the exterior of said four vertical side faces and at the exterior of a generally horizontal bottom surface.

5. A method in accordance with claim 1, wherein said wave propagation region comprises finite-difference computations, said first absorbing condition comprises a perfectly matched layer (PML) absorbing condition, and said second absorbing condition comprises a one-way wave equation (1WWE) absorbing condition.

6. A method of eliminating reflections resulting from an advancing simulated seismic wave contacting an artificial boundary in a computer implemented migration of seismic data, said method comprising:
   (a) storing an earth velocity model having a wavefield propagation region in a computer memory, wherein said propagation region is truncated by limited capacity of said computer memory;
   (b) surrounding said computer memory contacting truncated boundaries of said propagation region with a wave absorbing region, wherein said absorbing region comprises two types of absorbing conditions;
   (c) wherein a perfectly matched layer (PML) absorbing condition is applied on exterior surfaces of memory volumes contacting said truncated propagation region, and a second one-way wave equation (1WWE) absorbing condition is applied at exterior edges and corners of said truncated propagation region in said computer memory;
   (d) imposing said 1WWE absorbing condition on the exterior surface of said first absorbing condition; and
   (e) computing seismic wave propagation in said earth velocity model and in said absorbing region, wherein said advancing simulated seismic wave is essentially absorbed in said absorbing region;

wherein said PML absorbing conditions are governed by four variables expressed in the set of equations comprising:

$$\frac{\partial q}{\partial t} + \alpha q = -\frac{\partial p}{\partial N}$$

$$\frac{\partial U_{L1}}{\partial t} + \beta U_{L1} = -\frac{\partial p}{\partial L_2}$$

$$\frac{\partial U_{L2}}{\partial t} + \beta U_{L2} = -\frac{\partial p}{\partial L_2}$$

$$\frac{\partial p}{\partial t} = -C^2(L_1, L_2)\left(\frac{\partial U_{L1}}{\partial L_1} + \frac{\partial U_{L2}}{\partial L_2} + \frac{\partial q}{\partial N}\right).$$

7. A method of eliminating reflections resulting from an advancing simulated seismic wave contacting an artificial boundary in a computer implemented migration of seismic data, said method comprising:
   (a) storing an earth velocity model having a wavefield propagation region in a computer memory, wherein said propagation region is truncated by limited capacity of said computer memory;
   (b) surrounding said computer memory contacting truncated boundaries of said propagation region with a wave absorbing region, wherein said absorbing region comprises two types of absorbing conditions;
   (c) wherein a first absorbing condition is applied on exterior surfaces of memory volumes contacting said truncated propagation region, and a second absorbing condition is applied at exterior edges and corners of said truncated propagation region in said computer memory;
   (d) imposing said second absorbing condition on the exterior surface of said first absorbing condition; and
   (e) computing seismic wave propagation in said earth velocity model and in said absorbing region, wherein said advancing simulated seismic wave is essentially absorbed in said absorbing region, by the following steps performed in the indicated sequence:
      (i) updating time and space variables in the finite-difference computations in said truncated wavefield propagation region;
      (ii) applying said second absorbing boundary conditions at the vertical edges and corners of said truncated propagation region;
      (iii) updating particle velocity variables and the q variable in the interior of said first absorbing region;
      (iv) applying said second boundary condition on the exterior of said first absorbing condition;

(v) updating the pressure variable in the interior of said absorbing region; and (vi) updating the pressure variable on two layers in said wavefield propagating region immediately above said absorbing region.

8. A method in accordance with claim 7, wherein said wavefield propagation region comprises a finite-difference computation region, said first absorbing condition comprises a perfectly matched layer (PML) absorbing condition, and said second absorbing condition comprises a one-way wave equation (1WWE) absorbing condition.

9. A method of establishing an absorbing region for terminating a wavefield propagation region of an earth velocity model stored in a computer memory, wherein said propagation region is truncated by limited memory capacity, said method comprising:

(a) surrounding said computer memory contacting truncated boundaries of said propagation region with a wave absorbing region, wherein said absorbing region comprises two types of absorbing conditions; and (b) wherein a first absorbing condition is applied on the exterior surfaces of memory volumes contacting said truncated propagation region, and a second absorbing condition is applied at the exterior edges and corners of said truncated propagation region in said computer memory.

10. A method in accordance with claim 9, additionally comprising:

imposing said second absorbing condition on the exterior surface of said first absorbing condition.

11. A method in accordance with claim 9, wherein said first absorbing condition is effective for attenuating advancing waves at essentially all incidence angles, and said second absorbing condition is effective for attenuating advancing waves at or near a selective incidence angle.

12. A method in accordance with claim 9, wherein said propagation region comprises a finite-difference computation region, said first absorbing region comprises perfectly matched layer (PML) absorbing condition, and said second absorbing condition comprises a one-way wave equation (1WWE) absorbing condition.

13. A method in accordance with claim 9, wherein said memory comprises a rectangularly shaped volume having four generally vertical side faces, and wherein said first absorbing condition is applied at the exterior of said four vertical side faces, and at the exterior of a generally horizontal bottom surface.

14. Apparatus for eliminating reflections resulting from an advancing simulated wave contacting an artificial boundary in a computer implemented migration of seismic data, said method comprising:

a computer programmed for:

(a) storing an earth velocity model having a wavefield propagation region in said computer memory; wherein said propagation region is truncated by limited capacity in said computer memory;

(b) surrounding said computer memory contacting truncated boundaries of said propagation region with a wave absorbing region, wherein said absorbing region comprises two types of absorbing conditions;

(c) wherein a first absorbing condition is applied on exterior surfaces of memory volumes contacting said truncated propagation region, and a second absorbing condition is applied at exterior edges and corners of said truncated propagation region in said computer memory;

(d) imposing said second absorbing condition on the exterior surface of said first absorbing condition; and (e) computing seismic wave propagation in said earth velocity model and in said absorbing region, wherein said simulated advancing seismic wave is essentially absorbed in said absorbing region.

15. Apparatus in accordance with claim 14, wherein said memory comprises a rectangularly shape volume having four generally vertical side faces, and wherein said first absorbing condition is applied at the exterior of said four vertical side faces and at the exterior of a generally horizontal bottom surface.

16. Apparatus in accordance with claim 14, wherein said wave propagation region comprises finite-difference computations, said first absorbing condition comprises a perfectly matched layer (PML) absorbing condition, and said second absorbing condition comprises a one-way wave equation (1WWE) absorbing condition.

17. Apparatus in accordance with claim 14, wherein said first absorbing condition is effective for attenuating waves at essentially all incident angles, and said second absorbing condition is effective for attenuating waves at or near a selective incidence angle.

18. Apparatus for eliminating reflections resulting from an advancing simulated wave contacting an artificial boundary in a computer implemented migration of seismic data, said method comprising:

a computer programmed for:

(a) storing an earth velocity model having a wavefield propagation region in said computer memory; wherein said propagation region is truncated by limited capacity in said computer memory;

(b) surrounding said computer memory contacting truncated boundaries of said propagation region with a wave absorbing region, wherein said absorbing region comprises two types of absorbing conditions;

(c) wherein a first absorbing condition is applied on exterior surfaces of memory volumes contacting said truncated propagation region, and a second absorbing condition is applied at exterior edges and corners of said truncated propagation region in said computer memory;

(d) imposing said second absorbing condition on the exterior surface of said first absorbing condition; and (e) computing seismic wave propagation in said earth velocity model and in said absorbing region, wherein said simulated advancing seismic wave is essentially absorbed in said absorbing region, by the following steps performed in the indicated sequence:

(i) updating time and space variables in the finite-difference computations in said truncated wavefield propagation region;

(ii) applying said second absorbing boundary conditions at the vertical edges and corners of said truncated propagation region;

(iii) updating particle velocity variables and the q variable in the interior of said first absorbing region;

(iv) applying said second boundary condition on the exterior of said first absorbing condition;

(v) updating the pressure variable in the interior of said absorbing region; and (vi) updating the pressure variable on two layers in said wavefield propagating region immediately above said absorbing region.

19. Apparatus for eliminating reflections resulting from an advancing simulated wave contacting an artificial boundary in a computer implemented migration of seismic data, said method comprising:

a computer programmed for:

(a) storing an earth velocity model having a wavefield propagation region in said computer memory;

wherein said propagation region is truncated by limited capacity in said computer memory;

(b) surrounding said computer memory contacting truncated boundaries of said propagation region with a wave absorbing region, wherein said absorbing region comprises two types of absorbing conditions;

(c) wherein a perfectly matched layer (PML) absorbing condition is applied on exterior surfaces of memory volumes contacting said truncated propagation region, and a one-way wave equation (1WWE) absorbing condition is applied at exterior edges and corners of said truncated propagation region in said computer memory;

(d) imposing said 1WWE absorbing condition on the exterior surface of said first absorbing condition; and (e) computing seismic wave propagation in said earth velocity model and in said absorbing region, wherein said simulated advancing seismic wave is essentially absorbed in said absorbing region, wherein said PML absorbing conditions are governed by the set of equations comprising:

$$\frac{\partial q}{\partial t} + \alpha q = -\frac{\partial p}{\partial N}$$

$$\frac{\partial U_{L1}}{\partial t} + \beta U_{L1} = -\frac{\partial p}{\partial L_2}$$

$$\frac{\partial U_{L2}}{\partial t} + \beta U_{L2} = -\frac{\partial p}{\partial L_2}$$

$$\frac{\partial p}{\partial t} = -C^2(L_1, L_2)\left(\frac{\partial U_{L1}}{\partial L_1} + \frac{\partial U_{L2}}{\partial L_2} + \frac{\partial q}{\partial N}\right).$$

* * * * *